(12) United States Patent
Hisada et al.

(10) Patent No.: US 6,401,857 B1
(45) Date of Patent: Jun. 11, 2002

(54) SWING ARM DEVICE FOR FOUR-WHEELED ALL-TERRAIN VEHICLE

(75) Inventors: Kazumasa Hisada; Kazuhiro Maeda, both of Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/525,260

(22) Filed: Mar. 14, 2000

(30) Foreign Application Priority Data

Mar. 24, 1999 (JP) .............................................. 11-79649

(51) Int. Cl.$^7$ .............................................. B60K 17/32
(52) U.S. Cl. ........................ 180/344; 180/370; 180/233; 180/244
(58) Field of Search ................................ 180/344, 370, 180/233, 244, 215

(56) References Cited

U.S. PATENT DOCUMENTS

| | | | | |
|---|---|---|---|---|
| 4,667,760 A | * | 5/1987 | Takimoto | |
| 4,714,126 A | * | 12/1987 | Shinozaki et al. | |
| 4,730,689 A | * | 3/1988 | Takahashi et al. | |
| 4,856,373 A | * | 8/1989 | Washizawa | |
| 5,467,839 A | * | 11/1995 | Yoshio | |
| 5,515,940 A | * | 5/1996 | Shichinohe et al. | |
| 5,775,457 A | * | 7/1998 | Handa et al. | |
| 6,073,731 A | * | 6/2000 | Ieda | |
| 6,182,800 B1 | * | 2/2001 | Mochizuki et al. | |

FOREIGN PATENT DOCUMENTS

JP          10114260          6/1998

* cited by examiner

*Primary Examiner*—Lanna Mai
*Assistant Examiner*—Ruth Ilan
(74) *Attorney, Agent, or Firm*—Oliff & Berridge, PLC

(57) ABSTRACT

The swing arm device is divided into an arm body and a rear housing body. The arm body has a front end pivot shaft, a drive shaft case, a leg portion and a brake case provided behind the drive shaft case and is an integral aluminum casting. The rear housing body has a gear case, a left case portion and a rear axle case and is an integral aluminum casting. The dividing plane is almost perpendicular to the shaft axis of a drive shaft. The arm body and the rear housing body are separatably fastened together with a bolt. Therefore, in the swing arm device, a small number of parts are required, a welding work takes less labor and time, a necessary rigidity can easily be kept and an assembling work can easily be carried out.

7 Claims, 8 Drawing Sheets

SWING ARM DEVICE FOR FOUR-WHEELED ALL-TERRAIN VEHICLE

BACKGROUND OF THE INVENTION

1. Field of the Invention

The present invention relates to a swing arm device for a four-wheeled all-terrain vehicle.

2. Description of the Related Art

FIG. 11 is a plan view showing a swing arm device according to the prior art. An arm body 100 comprises a cylindrical front end pivot shaft 101, a drive shaft case 102 and a leg portion 105 which are extended rearward from the right and left ends of the pivot shaft 101 respectively, a cross member 104 for connecting the rear ends of the drive shaft case 102 and the leg portion 105, and a rear axle case 115 coupled to the rear end of the leg portion 105 through connecting members 106, 107 and 108. All the members 101, 102, 104, 105, 115, 106, 107 and 108 are individually manufactured and joined to one another by welding. Moreover, a bracket 116 for connecting a rear shock absorber is welded to the central portion of the rear axle case 115.

A gear case 110 for a final reduction gear and a brake case 111 are separately formed for the above-mentioned arm body 100. The gear case 110 is fastened to the rear end face of the drive shaft case 102 and the left end face of the rear axle case 115 with bolts or the like, and the brake case 111 is fixed to the right end face of the rear axle case 115 with bolts or the like. A drum type brake is provided as a braking device accommodated in the brake case 111.

As the prior art document which has described a structure other than the structure in FIG. 11, Japanese Laid-Open Patent Publication No. Hei 10-114260 has disclosed a structure in which a brake case is provided on the rear end of a drive shaft case and a gear case is fastened to the rear end of the brake case.

In the swing arm device shown in FIG. 11, the front end pivot shaft 101 and the drive shaft case 102 are joined to each other by welding. Furthermore, the cross member 104 and the drive shaft case 102 and leg portion 105, the leg portion 105 and the pivot shaft 101, and the connecting members 106, 107 and 108 are joined to each other or to one another by welding. Consequently, the number of parts is increased and a welding work takes a lot of labor and time. Moreover, if a sufficient rigidity is kept, weight is increased. Thus, there has been a problem in that it is difficult to reduce weight. Furthermore, it is necessary to assemble each part while adjusting it. Thus, an assembling work takes a lot of labor and time.

SUMMARY OF THE INVENTION

It is an object of the present invention to provide a swing arm device for a four-wheeled all-terrain vehicle in which a small number of parts are required, a welding work takes less labor and time, a light weight can be obtained, a necessary rigidity can easily be kept and an assembling work can easily be carried out.

A first aspect of the present invention is directed to a swing arm device for a four-wheeled all-terrain vehicle comprising a rear housing body, and an arm body including, a front end pivot shaft rotateably provided on a vehicle frame, a leg portion extended rearward from the pivot shaft, a drive shaft case extended rearward from the pivot shaft for accommodating a drive shaft for wheel driving, and a brake case provided at a rear end of the drive shaft case, wherein the arm body is integrally formed into one object by aluminum cast. Consequently, the number of parts can be reduced. In addition, a joining work step using welding can be omitted, manufacture can easily be performed and a light weight can also be obtained.

A second aspect of the present invention is directed to the swing arm device for a four-wheeled all-terrain vehicle according to the first aspect of the present invention, wherein a rear end of the brake case is open and a joining face for joining to a gear case of the rear housing case is formed on the rear end. In addition to the advantage according to the first aspect of the present invention, consequently, it is possible to obtain a swing arm device in which the parts related to a brake can easily be processed and the assembly of a braking device such as the assembly of a brake plate can easily be carried out.

A third aspect of the present invention is directed to the swing arm device for a four-wheeled all-terrain vehicle according to the first aspect of the present invention, wherein a rear end portion of the leg portion and the brake case are connected to each other, a rear end portion of the connected the leg portion and the brake case being formed in a flange-shape so that the joining face of the brake case and a rear end face of the leg portion are arranged on the same plane. More specifically, the rear end face of the brake case and the rear end face of the leg portion are arranged on the same plane. Therefore, it is possible to obtain a swing arm body in which processings such as casting, grinding and the like can easily be performed and a dimensional precision is excellent. Moreover, the rear end portions of the brake case and the leg portion are connected to each other by means of the flange. Therefore, it is possible to easily keep a necessary rigidity.

A fourth aspect of the present invention is directed to a swing arm device for a four-wheeled all-terrain vehicle according to the first aspect of the present invention, wherein the swing arm device being divided into the arm body and the rear housing body having the gear case to be joined to the joining face formed on the rear end of the brake case by a dividing plane which is substantially perpendicular to a shaft axis of the drive shaft, the arm body and the rear housing body being joined to each other with a bolt thereby to be separatable. Consequently, the manufacture can easily be performed. In addition, the longitudinal two-dividing structure is used. Therefore, it is not necessary to perform adjustment such as alignment of the arm body and the rear housing portion. Thus, excellent assemble-ability can be obtained. Moreover, a necessary rigidity can also be obtained. Furthermore, the seal elements for a braking device can be decreased. As a result, the number of parts can be reduced still more.

A fifth aspect of the present invention is directed to the swing arm device for a four-wheeled all-terrain vehicle according to the fourth aspect of the present invention, wherein the rear housing body is integrally formed into one object which has the gear case and a rear axle case by aluminum cast. Consequently, the number of parts can be reduced still more.

A sixth aspect of the present invention is directed to the swing arm device for a four-wheeled all-terrain vehicle according to the second aspect of the present invention, further comprising a wet multi-disc type brake in the brake case, the brake case communicating with the gear case to contain lubricating oil therein. Consequently, it is possible to efficiently cool the brake while keeping the seal-ability of the brake case.

A seventh aspect of the present invention is directed to a swing arm device for a four-wheeled all-terrain vehicle comprising, a front end pivot shaft portion rotatably provided on a vehicle frame to extend in the transverse direction of the vehicle and having a shaft axis being a center in swing with respect to the vehicle frame, a drive shaft case portion accommodating a drive shaft such that the drive shaft passes through the drive shaft case portion, a brake case portion accommodating a brake mechanism for braking rotation transmitted from the drive shaft to a rear axle, a gear case portion accommodating a reduction gear for reducing rotation transmitted from the drive shaft to the rear axle, a rear axle case portion accommodating the rear axle such that the rear axle passes through the rear axle case portion, a frame portion connecting one portion to other portion, wherein the swing arm device is divided to two parts whose joining faces are joined to each other, each of the two parts being formed such that the portions included therein are integrated with one another by aluminum cast.

Consequently, the whole is divided to two parts whose joining faces are joined to each other and each of the two parts is formed such that the portions included therein are integrated with one another by aluminum cast. Therefor, the number of parts can be reduced, a welding work takes less labor and time, a necessary rigidity can easily be kept, and an assembling work can easily be carried out.

A eighth aspect of the present invention is directed to a swing arm device for a four-wheeled all-terrain vehicle according to the seventh aspect of the present invention, wherein the drive shaft case portion is provided to extend from the front end pivot shaft portion in the same direction as the drive shaft extends for accommodating the drive shaft extending from shaft axis of the front end pivot shaft portion in the direction substantially perpendicular to the shaft axis of the front end pivot shaft portion, the brake case portion is provided to extend on the rear end of the drive shaft case portion for accommodating one portion of a transmission shaft provided to extend on the tip of the drive shaft and the brake mechanism for braking rotation of the transmission shaft, the gear case portion and the rear axle case portion is provided to extend from the rear end of the brake case portion by a certain length in the direction as the drive case portion and the brake case portion substantially extend and to extend from there in substantially parallel with the shaft axis of the front end pivot shaft portion for accommodating other portion of the transmission shaft and a bevel gear reducing rotation of the transmission shaft while transmits the rotation to the rear axle and for causing the rear axle to pass through the rear axle case portion in substantially parallel with the shaft axis of the front end pivot shaft portion, the frame portion is provided to extend from the front end pivot case portion to a tip portion of the rear axle case portion in substantially parallel to a direction in which the drive shaft case portion extends, a portion of the brake case portion and the gear case portion which includes joined portion of the brake case portion and the gear case portion is connected to a middle portion of the frame portion by expanding inward of the vehicle, and a plane by which the swing arm device is divided exists to include joining plane between the brake case portion and the gear case portion including the expanded portion, to pass through the middle portion of the frame portion, and to be substantially perpendicular to the shaft axis of the drive shaft.

Consequently, the rear end face of the brake case portion and the front end face of gear case portion constitute the joining face respectively. Therefor, by constructing the swing arm device such that brake plates and the like are inserted into the brake case portion from its joining face and transmission shaft with small bevel gear and the like are inserted into the gear case portion from its joining face, it is possible to omit opens for inserting those parts from the out side. Moreover, the rear end face of the brake case portion and the foront end face of the gear case portion are joined to each other. Therefor, the seal elements for braking can be decreased. As a result, the number of parts can be reduced.

These objects as well as other objects, features and advantages of the invention will become more apparent to those skilled in the art from the following description with reference to the accompanying drawings.

DETAILED DESCRIPTION OF THE PREFERRED EMBODIMENT

Figure 1:
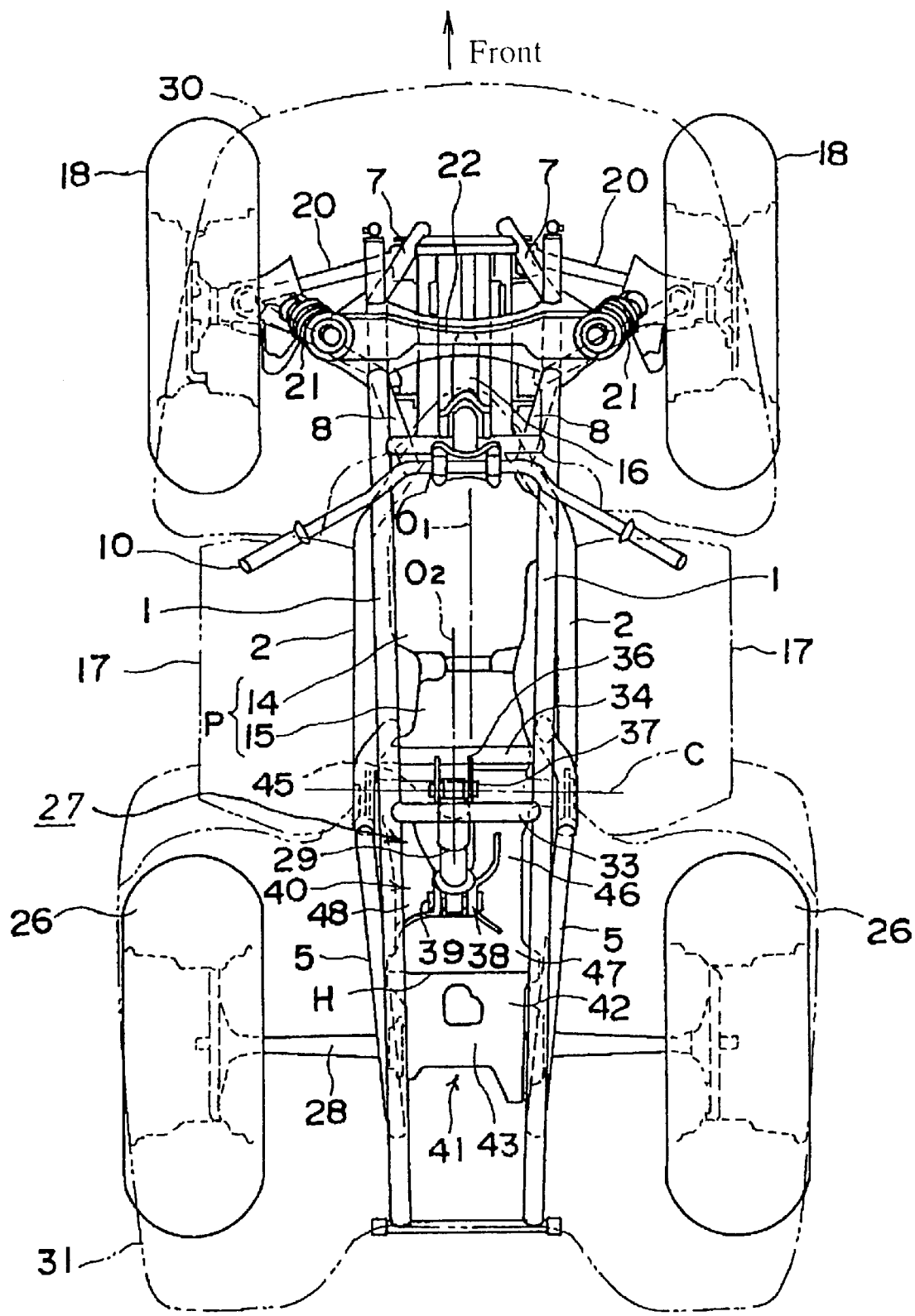
FIG. 1 is a plan view showing a four-wheeled all-terrain vehicle to which the present invention is applied.
Figure 2:
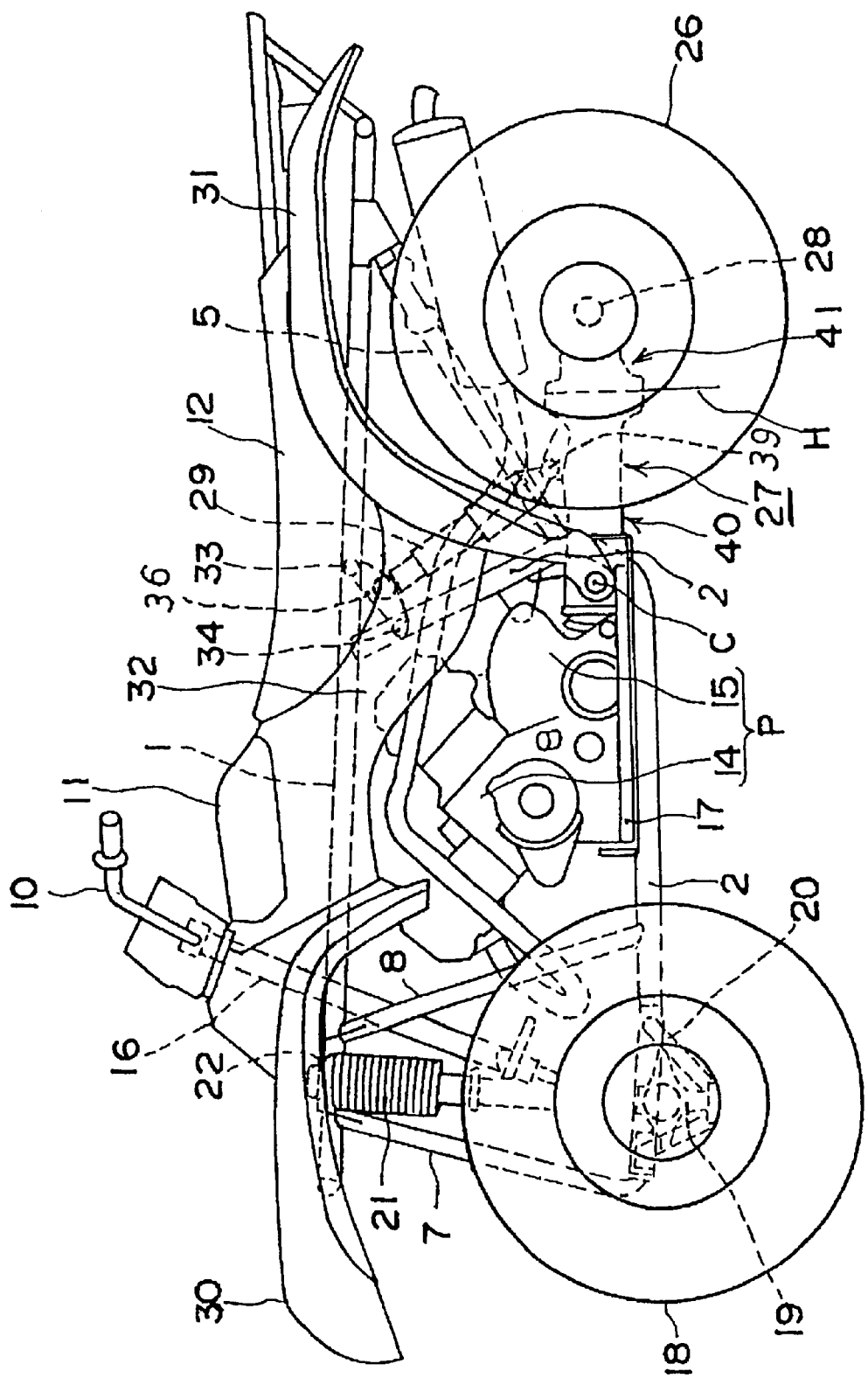
FIG. 2 is a left side view showing the four-wheeled all-terrain vehicle of FIG. 1.

FIGS. 1 and 2 show an example in which the present invention is applied to a straddle type four-wheeled all-terrain vehicle.

Referring to FIGS. 1 and 2, a vehicle frame comprises a pair of right and left upper pipes (upper frames) 1 which are extended in a longitudinal direction, a pair of right and left lower pipes (lower frames) 2, two pairs of front pipes 7 and 8 connecting the front portions of the upper and lower pipes 1 and 2, a pair of rear pipes 5 and the like.

In plan view, the right and left lower pipes 2 are extended in almost longitudinal direction. In side view, a front end of each the lower pipe 2 is situated almost just below a front end of corresponding upper pipe 1, and each the lower pipe 2 extends rearward from there by a certain length. Then, each the lower pipe 2 curves to the upper side to turn a rear end thereof obliquely forward and upward from there. Then, each the lower pipe 2 extends from there to an almost middle portion of corresponding upper pipe 1.

Each the rear pipe 5 is extended in obliquely rearward and upward from the curved portion of the lower pipe 2 to the rear end of corresponding upper pipe 1. All the pipes are connected to one another by welding.

A pair of right and left front wheels 18 and a pair of right and left rear wheels 26 are provided front and rear portions of the vehicle frame, respectively. A steering handlebar 10, a cover 11 and a straddle type seat 12 are provided sequentially from the front side in the upper portion of the vehicle frame. A power unit P including an engine 14, a transmission case 15 and the like is mounted between the upper pipes 1 and the lower pipes 2. A step plate 17 is provided on the right and left sides of the power unit P. A fuel tank can also be provided in the position of the cover 11.

The front wheel 18 is supported on the tip portion of a V-shaped suspending arm 20 through a knuckle 19 in such a manner that it can be steered to the right and left. As is well known, the front wheel 18 is steered by the steering handlebar 10 through a steering shaft 16 and the like. The suspending arm 20 is supported on the lower pipe 2 through a hinge or the like in such a manner that it can swing a vertical direction, and furthermore, is elastically held by a strut 21 from above. The upper end of the strut 21 is supported, through a ball joint, on a bracket 22 provided on the upper pipe 1.

A rear axle 28 of the rear wheels 26 is supported on the rear end portion of the swing arm device 27 according to the present invention. The front end portion of the swing arm device 27 is supported on the vehicle frame possible to swing with the shaft axis C of a pivot shaft (front end pivot shaft) 45 as the center of the swing and is elastically held by a rear shock absorber 29 from obliquely upward and forward direction.

Fenders 30 and 31 are provided above the front wheel 18 and the rear wheel 26, respectively. The vehicle frame has a side cover 32 and the like provided on the right and left sides. In FIG. 1, fenders 30, 31 and the step plate 17 are shown by virtual line.

As apparently from FIG. 1, the rear shock absorber 29 is provided on a position O2 that is deviated from a central line O1 of the width of the body of the vehicle to the left by a certain distance.

Figure 3:
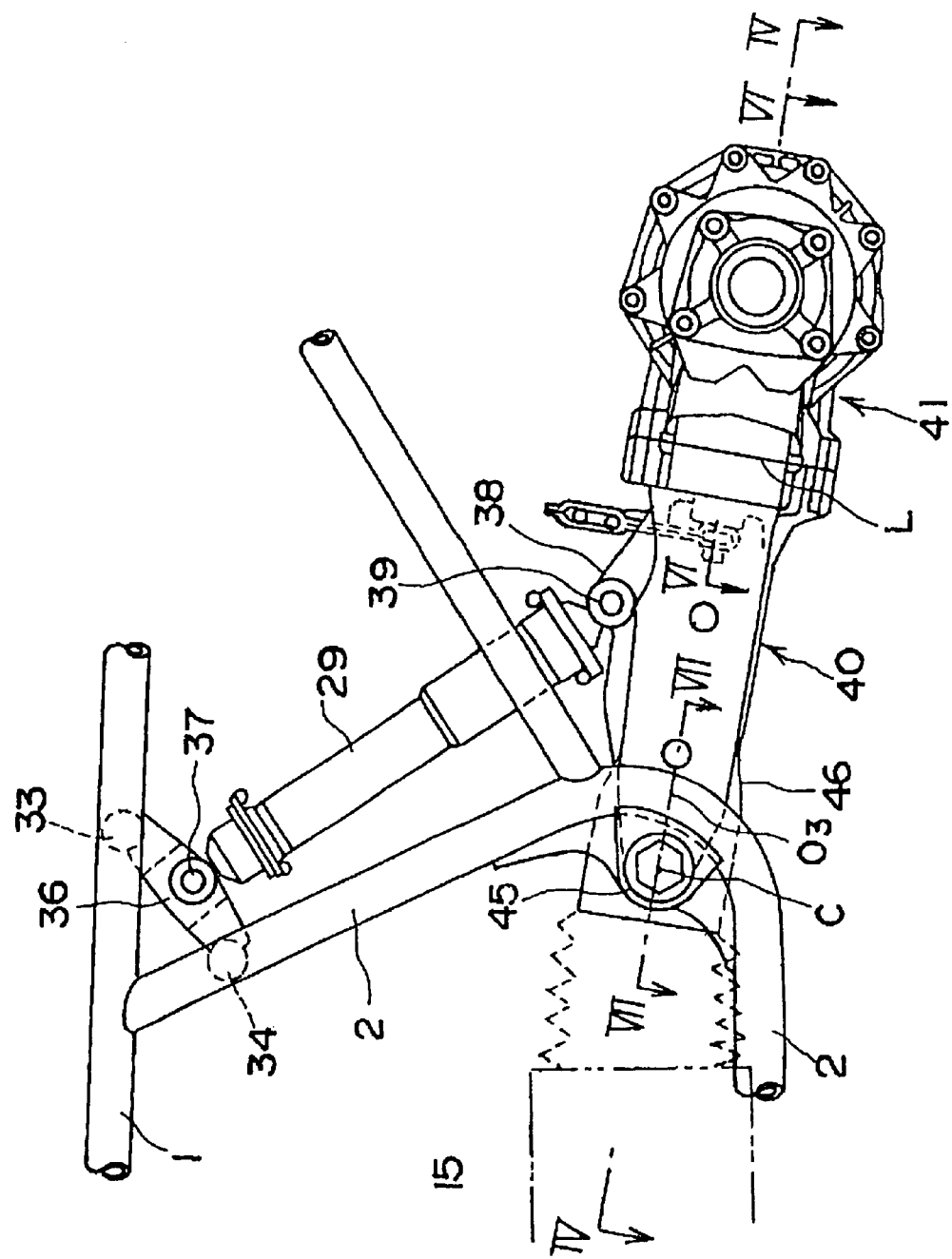
FIG. 3 is an enlarged side view showing a swing arm device.

FIG. 3 is a left side view showing the swing arm device 27. Referring to FIGS. 1 to 3, a bracket 36 is welded to cross pipes 33 and 34 which are provided between the right and left upper pipes 1 and between the right and left lower pipes 2, respectively. The upper end boss portion of the rear shock absorber 29 is rotatably supported on the bracket 36 through a pin 37. The lower end of the rear shock absorber 29 is rotatably connected through a pin 39 to a bracket 38 formed on the upper face of the swing arm device 27.

Figure 4:
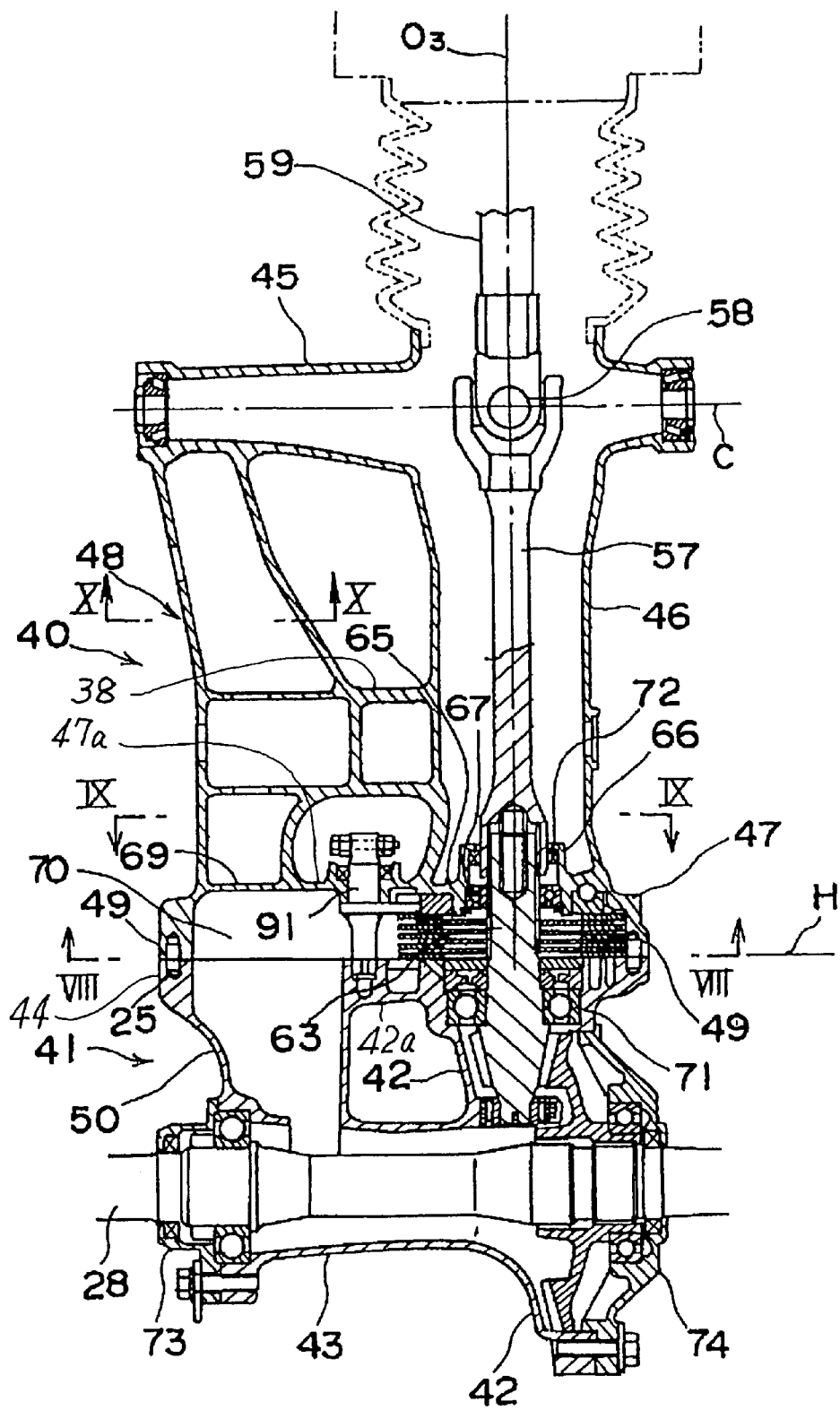
FIG. 4 is a sectional view taken along the line IV—IV in FIG. 3.
Figure 5:
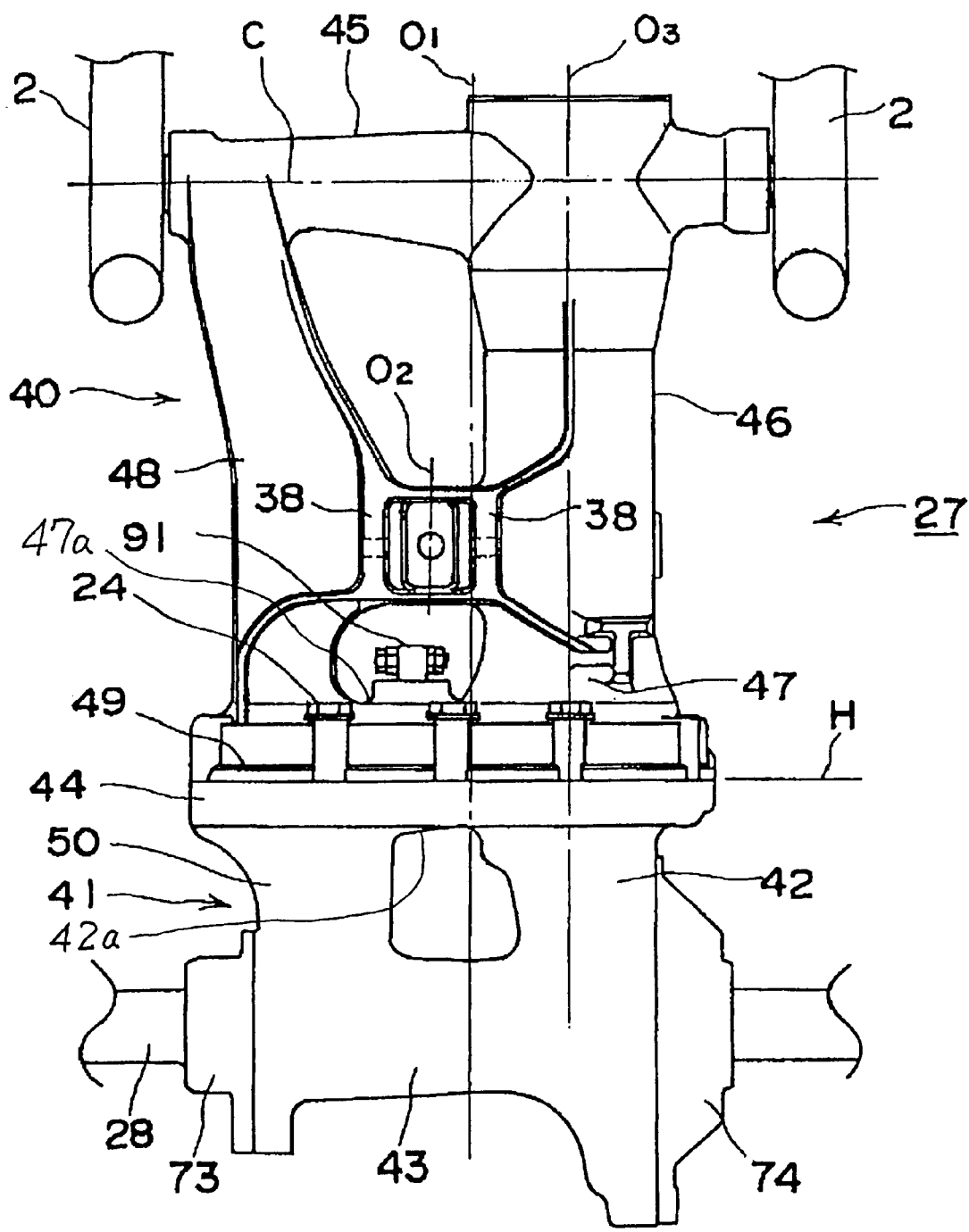
FIG. 5 is a plan view showing the swing arm device.

FIG. 4 is a sectional view taken along the line IV—IV in FIG. 3, and FIG. 5 is a plan view showing the swing arm device 27.

Referring to FIGS. 4 and 5, the swing arm device 27 is divided into an arm body 40 which constitutes front part and has a parallel crosses shape and the rear housing body 41 which constitutes a rear part. The swing arm device 27 is divided with a joining plane H that is parallel to the shaft axis C of the pivot shaft 45 and is almost perpendicular to the shaft axis O3 of a drive shaft as the dividing plane. The drive shaft will be described below.

The arm body 40 consists of an integral aluminum casting. The arm body 40 has a cylindrical front end pivot shaft 45 which is positioned in the front portion of the arm body 40 and is positioned on the shaft axis C extending in the transverse direction of the body, a cylindrical drive shaft case 46 which is extended rearward from a point situated a little to the right of the center of the pivot shaft 45, a left leg portion 48 which is extended rearward from the left end portion of the pivot shaft 45, a brake case 47 which is provided to extend rearward by short length from the rear end of the drive shaft case 46 and is connected to the rear end portion of the left leg portion 48 with the portion 47a expanded to the left thereof, and a joining flange portion 49 which is formed on the rear end potion of the connected brake case 47 and left leg portion 48, All these components (45, 46, 47, 47a, 48 and 49) are integrated with one another by aluminum cast. Moreover, the bracket 38 connecting the middle portion of the left leg portion 48 to that of the drive shaft case 46 and connected to the lower end of the rear shock absorber 29 is also integrated with those components (45, 46, 47, 47a, 48 and 49) by aluminum cast.

Figure 8:
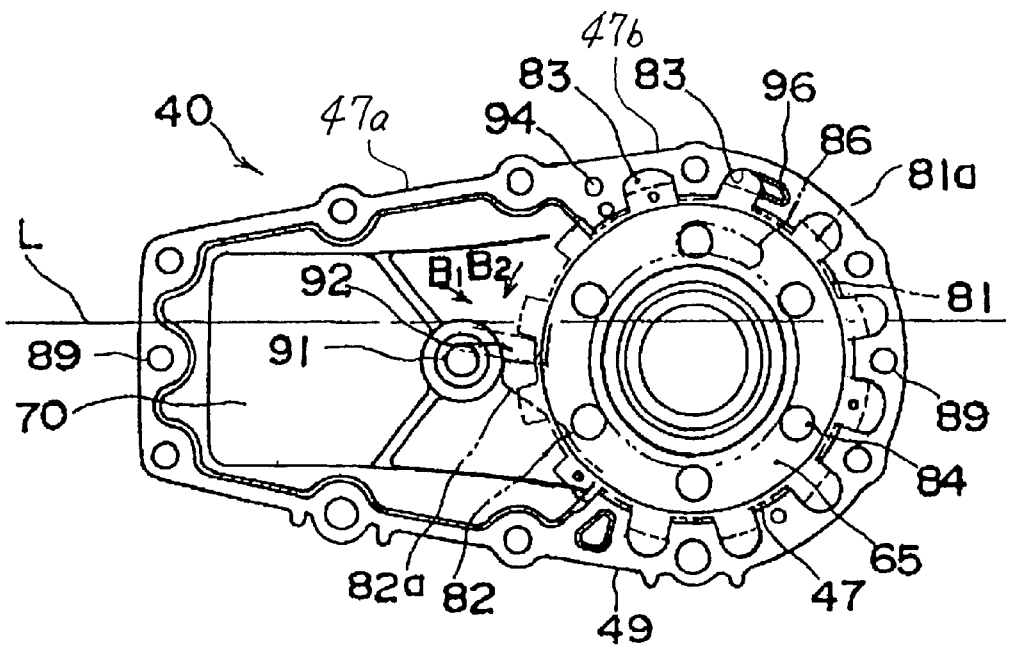
FIG. 8 is an enlarged sectional view taken along the line VIII—VIII in FIG. 4.

Here, as apparently from FIGS. 4, 5, 8, the rear end portion of the connected brake case 47 and left leg portion 48 is formed such that outer periphery face thereof is slightly swelled and constitutes the joining flange portion 49. Rear end face of the joining flange portion 49, as shown in FIG. 8, is formed in a shape like lay-down-trapezoid whose base member is transformed in semicircular shape and constitutes a joining face of the arm body 40 side. Accordingly, the left side portion of the rear end face of the joining flange portion 49 constitutes a rear end joining face of the left leg portion 48, and the other portion of that constitutes a rear end joining face of the brake case 47.

Referring to FIGS. 4, 5, the rear housing body 41 has a left case portion 50 to be joined to the rear end joining face of the left leg portion 48, a gear case 42 which is to be joined to the rear end joining face of the brake case 47 and is connected to the front end portion of the left case portion 50 with the portion 42a expanded to the left thereof, a rear axle case 43 provided behind the left case portion 50 and the gear case 42, and a front end flange portion 44 formed on the front end portion of the connected gear case 42 and left case portion 50.

All these components (42, 42a, 43, 44 and 50) are integrated with one another by aluminum cast. The front end portion of the connected gear case 42 and left case portion 50 is formed to have larger diameter than that of the other portion thereof and constitutes the front end flange portion 44. Front end face of the front end flange portion 44 is formed into a shape fitting into the rear end face of the joining flange portion 49 of the arm body 40 and constitutes a joining face of the rear housing body 41 side. Accordingly, the left side portion of the front end face of the front end flange portion 44 constitutes a front end joining face of the left case portion 50, and the other portion of that constitutes a front end joining face of the gear case 42.

The front end flange portion 44 is separatably fastened to the flange portion 49 of the rear end portion of the arm body 40 with a plurality of bolts 24 in a fluid-tight state in such a manner that both joining faces are butted with each other.

Further, the gear case 42 is formed to extend in a direction that the drive shaft case 46 and the brake case 47 are extending. The left case portion 50 is formed to extend in a direction that the left leg portion 48 is extending. The rear axle case 43 is formed to extend in the transverse direction of the body, and the rear ends of the left case portion 50 and the gear case 42 are integrally connected to a left side portion and a right side portion of the rear axle case 43, respectively. Bearing covers 73 and 74 are removably attached to the right and left ends of the rear axle case 43, respectively, and the rear axle 28 passes through the covers 73 and 74 in the transverse direction. Here, the left leg portion 48 and the left case portion 50 constitute the frame portion.

Figure 7:
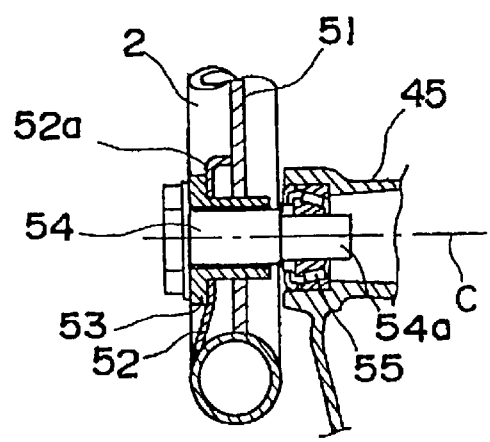
FIG. 7 is an enlarged sectional view taken along the line VII—VII in FIG. 3.

FIG. 7 is a sectional view taken along with a line VII—VII in FIG. 3, showing the structure supporting the pivot shaft 45 on the vehicle frame.

In the structure shown in FIG. 7, a pair of brackets 51 and 52 are welded to the curved portion on the rear end of the lower pipe 2 at interval in the transverse direction. A cylindrical nut 53 having flange is fitted and welded into inserting holes which are formed to be superposed with each other in side view on the brackets 51 and 52 respectively. A stepped bolt 54 is inserted into the cylindrical nut 53 to pass through it and is screwed it with thread portion formed on base portion thereof. A radial bearing 55 having seal member is fitted into a shaft portion formed on the tip portion of the stepped bolt 54. The end portion of the pivot shaft 45 is fitted into the radial bearing 55. Thereby, the end portion is rotatably supported on the shaft portion 54a of the stepped bolt 54 through the radial bearing 55. A bent portion 52a is formed in the bracket 52 located on the outer side of the body. The tip of the bent portion 52a is welded to the other bracket 51. Thereby, the cylindrical nut 53 supporting the pivot shaft 45 is supported on the frame by means of the brackets 51 and 52 disposed at interval.

Figure 10:
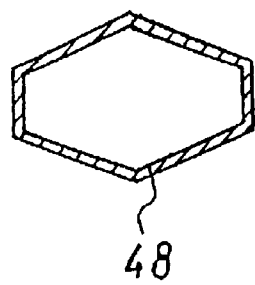
FIG. 10 is an enlarged sectional view taken along the line X—X in FIG. 4.
Figure 11:
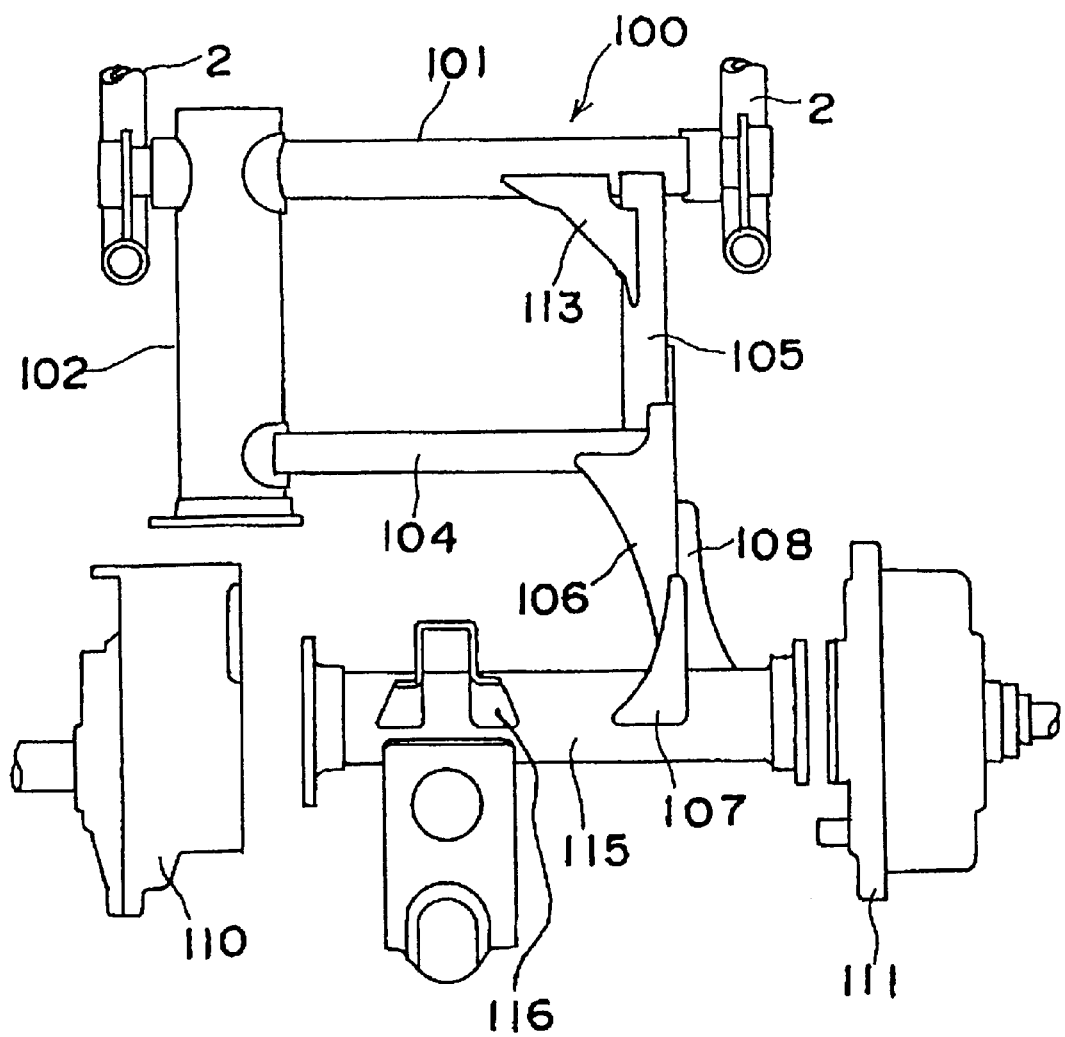
FIG. 11 is an exploded plan view showing a swing arm device according to the prior art.

Referring to FIG. 4, in the swing arm device, a separating wall portion 63 is formed at a position where the drive shaft case 46 and brake case 47 are connected to each other. Further, a boss portion 66 for a bearing is formed on the center portion of the separating wall portion 65 to extend in longitudinal direction. Therefor, the brake case 47 and drive shaft case 46 are separated by the separating wall portion 65 and boss portion 66. Moreover, the rear end of the brake case 47 is open. Therefor, brake plates 80 and 81 and the like which will be described below can be inserted into the brake case 47 from the back thereof. The left leg portion 48 is formed to have a hollow shape by walls on all sides as shown in FIG. 10 which is an enlarged sectional view taken along the line X—X of FIG. 4. Consequently, rigidity can be enhanced. A separating wall 69 is formed on the rear end portion of the left leg portion 48 as shown in FIG. 4. An oil chamber 70 is formed by the separating wall 69. The oil chamber 70 is opened in a rear portion thereof, and communicates with the inside of the left case portion 50 joined to the back side and also with the inside of the brake case 47 positioned in the right side thereof. The sectional shape of the left leg portion 48 is not restricted to the shape shown in FIG. 10 if the rigidity can be kept.

The drive shaft 57 is provided in the drive shaft case 46. The front end of the drive shaft 57 is coupled to an output shaft 59 of the engine side through a cross joint 58 on the shaft axis C of the pivot shaft 45. The rear end of the drive shaft 57 is formed cylindrically to have inner spline teeth. The rear end of the drive shaft 57 is fitted in the inner peripheral face of the boss portion 66 through a seal 72 and is spline-fitted in a transmission shaft 63 provided in the brake case 47 such that it is slidable in an axial direction.

Figure 6:
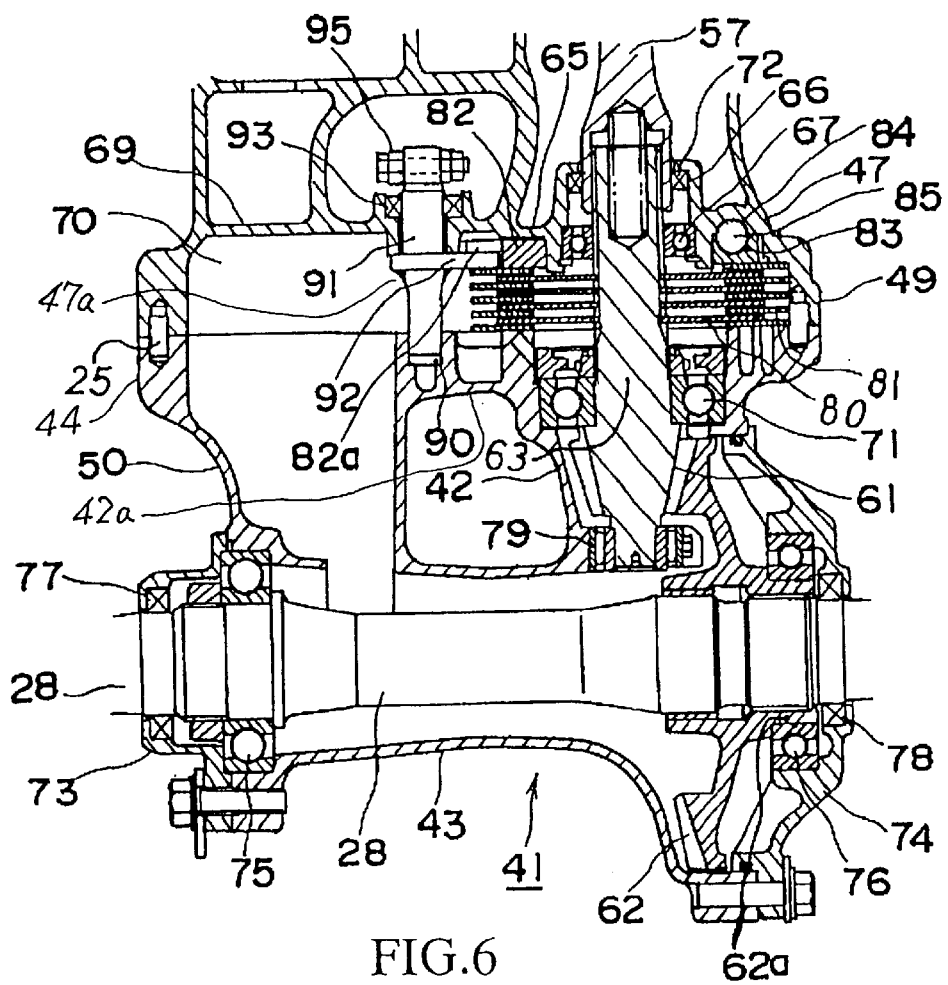
FIG. 6 is an enlarged sectional view taken along the line VI—VI in FIG. 3, showing the rear portion of the swing arm device.

FIG. 6 is an enlarged view taken along the line VI—VI in FIG. 3, showing the rear portion of the swing arm device. Referring to FIG. 6, the transmission shaft 63 is rotatably supported by a bearing 67 fitted in the inner peripheral face of the boss portion 66 of the brake case 47 and a bearing 71 fitted in the inner peripheral face of the front portion of a gear case 42. The rear end portion of the transmission shaft 63 projects from the bearing 71 into the inside of the gear case 42 and a small bevel gear 61 is integrally formed on it. The tip shaft portion of the small bevel gear 61 is rotatably supported on the gear case 42 through a needle bearing 79. A large bevel gear 62 engaged with the small bevel gear 61 is provided in the inside of the portion from the right side portion of the gear case 42 to the right end portion of the rear axle portion 43. A hub 62a of the large bevel gear 62 is rotatably supported by means of a bearing 76 fitted in a right bearing cover 74 and is spline-fitted in the outer spline teeth of the rear axle 28.

The rear axle 28 is rotatably supported on the rear axle case 43 by means of the bearing 76 fitted in the inner peripheral face of the right bearing cover 74 and a bearing 75 fitted in an inner peripheral face of the left end of the rear axle case 43. Seals 77 and 78 are fitted in the shaft outlet portions of the bearing covers 73 and 74 respectively, thereby sealing the rear axle case 43.

A wet multi-disc type brake is provided in the brake case 47. The wet multi-disc type brake is constituted of a plurality of rotary brake plates 80 which are spline-fitted into the transmission shaft 63 movably in an axial direction and rotate together with the transmission shaft 63, a plurality of stationary brake plates 81 provided alternately with the rotary brake plates 80, a ring-shaped press cam 82 provided on the back side of the separating wall 65 and fitted to the outer periphery of the rear end portion of the boss portion 66 movably in an axial direction, a steel ball 85 rotatably fitted in a hemispherical concave portion 84 formed on the separating wall 65 and engaged with an inclined cam groove 83 of the press cam 82, and the like.

FIG. 8 is an enlarged sectional view taken along the line VIII—VIII in FIG. 4, showing the swing arm body 40 seen from the back with the parts for a brake removed. In FIG. 8, the stationary brake plate 81 and the press cam 82 is illustrated in chain line and chain double-dashed line respectively.

Referring to FIG. 8, the stationary brake plate 81 has a plurality of outward projections 81a provided at intervals in the circumferential direction. Each of the projections 81a is engaged axially movably with an axial groove 83 formed on inner periphery face of the body portion 47b of the brake case 47 having almost circular cross section. The plural hemispherical concave portions 84 are formed on the separating wall 65 of the brake case 47 at same intervals in the circumferential direction. A inclined cam groove 86 is formed to extend in a circular arc from the point corresponding to the position of the concave portion 84 to the point advanced by a certain angle in the opposite direction to an arrow B2 on the front face of the press cam 82, and is formed such that a bottom thereof becomes shallower in the opposite direction to an arrow B2. Thereby, when the press cam 82 is rotated in the direction of the arrow B2, the press cam 82 is pushed rearward by the cam action of the inclined cam groove 86 and the steel ball 85, so that both the brake plates 80 and 81 are pinched between the press cam 82 and the front end face of the gear case 42 shown in FIG. 6 and are pressed with them. Thereby, the transmission shaft 63 is braked.

Figure 9:
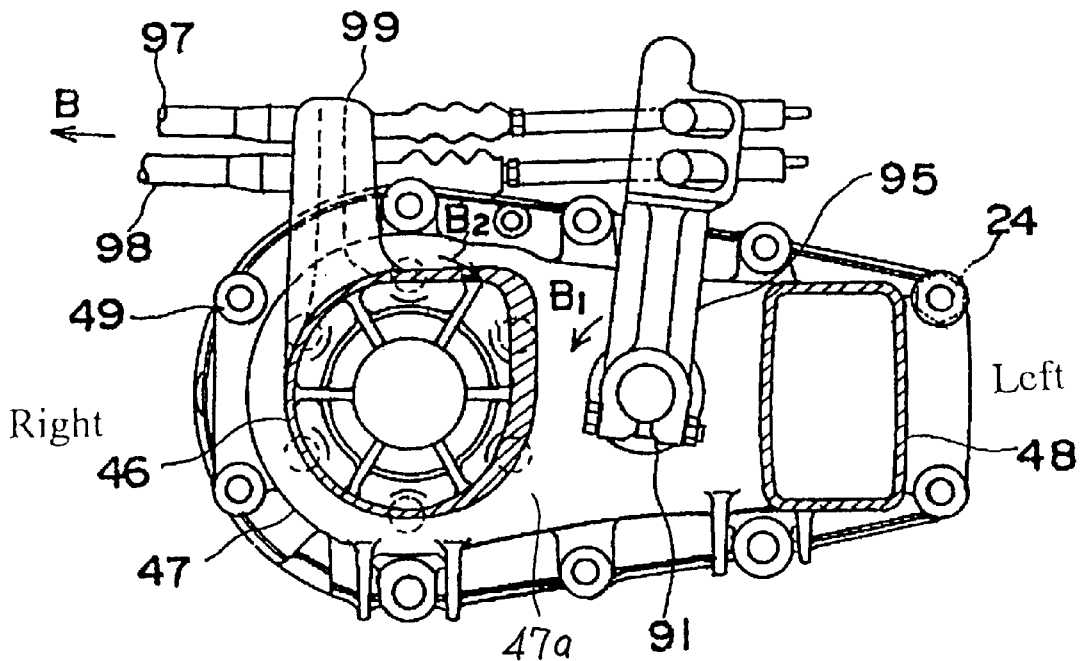
FIG. 9 is an enlarged sectional view taken along the line IX—IX in FIG. 4.

Referring to FIGS. 6, 8, 9, in order to rotate the press cam 82, an engagement projection 82a which projects to the left is formed on the left side of the press cam 82 and an internal lever 92 welded to a braking rotary shaft 91 is engaged with the engagement projection 82a in the circumferential direction. The braking rotary shaft 91 is rotatably supported on the brake case 47 through a seal 93 and projects forward from that. An external lever 95 extending upward is fixed to the projecting portion of the braking rotary shaft 91. The rear end of the rotary shaft 91 is fitted in the front concave portion 90 provided on the front end face of the rear housing body 41 and supported on that.

Two upper and lower operating cables 97 and 98 are coupled to the external lever 95 as shown in FIG. 9. The operating cable 97 is coupled to a manual brake lever through a bracket 99 formed on the upper face of the brake case 47 and the operating cable 98 is interlockingly coupled to a foot-operated brake pedal. More specifically, by pulling the operating cable 97 or 98 in the direction of an arrow B with the operation of the manual brake lever or the foot-operated brake pedal, the brake lever 95 is rotated in the direction of an arrow B1. Thereby, the press cam 82 is rotated in the direction of an arrow B2 through the internal lever 92 and the engagement projection 82a as partially shown in the virtual line of FIG. 8, so that the brake plates 80 and 81 are pinched between the press cam 82 and the front end face of the gear case 42 as described above. Thereby, the transmission shaft 63 is braked.

The lubricating structures of the wet multi-disc type brake and the final reduction gear mechanism will be described below.

In FIG. 8, an oil passage 96 communicating with uppermost axial groove 83 is formed on the upper wall of the brake case 47. The rear end of the oil passage 96 communicates with the inside of the gear case 42 through an opening formed on the upper wall of the gear case 42 of FIG. 6, which is not shown. More specifically, the brake case 47, the gear case 42, the rear axle case 43 and the oil chamber 70 provided on the rear end of the left leg portion constitute a circulation type lubricating oil containing chamber in which they communicate with each other. The lubricating oil is filled up to almost a level L in FIG. 8. Moreover, a breather hole 94 is formed on the upper wall of the brake case 47.

The lubricating oil is utilized for cooling the braking device and lubricating the bevel gears 61 and 62 shown in FIG. 6. The lubricating oil is stirred by the vertical swing of the swing arm device itself, the rotation of the bevel gears 61 and 62 and the like, and circulates in the cases 47, 42 and 43 and the oil chamber 70. For example, the lubricating oil is supplied from the gear case 42 to the upper ends of the brake plates 80 and 81 through the oil passage 96, and flows down from a clearance between the brake plates 80 and 81. Then, the lubricating oil circulates from the brake case 47 to the gear case 42 through the oil chamber 70 and the rear axle case 43.

Referring to FIGS. 4, 5, 6, in the case where the swing arm device is to be assembled, the seal 72, the bearing 67, the steel ball 85, the braking rotary shaft 91, the press cam 82, the brake plates 80 and 81 and the like are incorporated into the brake case 47 from the back, the drive shaft 57 is inserted from the front into the drive shaft case 46, and the rear end of the drive shaft 57 is inserted into the seal 72.

Then, the rear housing body 41 to which the transmission shaft 63 and the like are attached is adjusted to the joining face of the arm body 40 from the back, is positioned with a positioning stud pin 25, and is fastened with the bolt 24 as shown in FIG. 5.

Then, an assembly of the right cover 74, the rear axle 28, the large bevel gear 62 and the like is attached to the rear axle case 43 and the left cover 73 is fixed to that.

In the embodiment, the whole rear end of the arm body 40 having a parallel crosses shape and the whole front end of the rear housing body 41 having a parallel crosses shape are formed as joining faces. And, the arm body 40 as the front part and the rear housing body 41 as the rear part are fastened by causing the joining faces to butt to each other. Therefore, the whole swing arm device has a high rigidity to torsion or the like. The arm body 40 and the rear housing body 41 can be assembled in one direction, and furthermore, only joining their flange faces is required but adjustment in assembling or the like is not required. Consequently, assemble-ability can be considerably enhanced.

While a dry single plate or drum type brake can also be employed, the wet multi-disc type brake is suitable in consideration of the cooling function.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A swing arm device for a four-wheeled all-terrain vehicle comprising:
   a rear housing body including a gear case for accommodating final reduction gears and a rear axle case for accommodating a rear axle; and
   an arm body including:
      a front end pivot shaft rotatably provided on a vehicle frame,
      a leg portion extended rearward from the pivot shaft,
      a drive shaft case extended rearward from the pivot shaft for accommodating a drive shaft for wheel driving,
      a brake case provided at a rear end of the drive shaft case wherein the arm body is formed in one piece by aluminum cast, and
      a first flange portion connecting rear end portions of the leg portion and the brake case to each other, the first flange portion having a rear end face to be joined to the rear housing body.

2. The swing arm device according to claim 1, wherein the rear end face of the first flange portion has an opening through which a brake plate of a brake device accommodated in a brake case is accommodated into and removed out of the brake case in an axial direction of the brake case.

3. The swing arm device according to claim 2, wherein the brake device accommodated in the brake case is a wet multi-disc type brake and the brake case communicates with the rear axle case via an oil chamber formed in a rear portion of the leg portion and laterally of the brake case.

4. The swing arm device according to claim 3, wherein the first flange portion defines a space including at least rear end portions of the brake case and the oil chamber at the rear end face of the arm body.

5. The swing arm device according to claim 1, wherein the rear housing body has a second flange portion having a joining face to be joined to the arm body and the flange portions of the arm body and the rear housing body are joined to each other with a bolt thereby to be separatable.

6. The swing arm device according to claim 5, wherein the rear housing body including the gear case, the axle case and the second flange portion are formed in one piece by aluminum cast.

7. A swing arm device for a four-wheeled all terrain vehicle, comprising:
   a front end pivot shaft portion rotatably provided on a vehicle frame to extend in the transverse direction of the vehicle, a shaft axis thereof being a center in swing with respect to the vehicle frame;
   a drive shaft case portion accommodating a drive shaft such that the drive shaft passes through the drive shaft case portion;
   a brake case portion accommodating a brake mechanism for braking rotation transmitted from the drive shaft to a rear axle;

a gear case portion accommodating a reduction gear for reducing rotation transmitted from the drive shaft to the rear axle;

a rear axle case portion accommodating the rear axle such that the rear axle passes through the rear axle case portion;

a frame portion connecting the front end pivot shaft portion to the rear axle case portion, wherein the swing arm device comprises two parts which are joined to each other at a joining plane, each of the two parts being formed in one piece by aluminum cast, the drive shaft case portion extends from the front end pivot shaft portion rearward to accommodate the drive shaft which extends from a shaft axis of the front end pivot shaft portion rearward, the brake case portion is provided to extend on the rear end of the drive shaft case portion for accommodating one portion of a transmission shaft provided to extend on a rear end of the drive shaft and the brake mechanism for braking rotation of the transmission shaft, the gear case portion and the rear axle case portion are provided to extend from the rear end of the brake case portion by a certain length in the direction in which the drive shaft case portion and the brake case portion substantially extend and to extend from there substantially in parallel with the shaft axis of the front end pivot shaft portion for accommodating an other portion of the transmission shaft and a bevel gear reducing rotation of the transmission shaft while transmitting the rotation to the rear axle and for causing the rear axle to pass through the rear axle case portion substantially parallel with the shaft axis of the front end pivot shaft portion, the frame portion is provided to extend from the front end pivot shaft portion to a tip portion of the rear axle case portion substantially parallel to a direction in which the drive shaft case portion extends, a boundary portion of the brake case portion and the gear case portion is connected to a middle portion of the frame portion by a connecting portion, and the joining plane of the two parts passes through the boundary portion of the brake case portion and the gear case portion, the middle portion of the frame portion, and the connecting portion, and is substantially perpendicular to a shaft axis of the drive shaft.

* * * * *